United States Patent [19]

Martino

[11] 4,380,925
[45] Apr. 26, 1983

[54] DEVICE FOR BALANCING DISKS
[75] Inventor: Michael S. Martino, South Windsor, Conn.
[73] Assignee: United Technologies Corporation, Hartford, Conn.
[21] Appl. No.: 301,930
[22] Filed: Sep. 14, 1981
[51] Int. Cl.³ .................... G01M 1/00; G06C 1/00
[52] U.S. Cl. .................................. 73/66; 73/487; 29/156.8 R; 235/89 R
[58] Field of Search .............. 73/66, 487; 29/156.8 R; 235/89 R

[56] References Cited

U.S. PATENT DOCUMENTS 4,302,966  12/1981  Ohnishi et al. .................... 73/66

FOREIGN PATENT DOCUMENTS 124691   2/1960   U.S.S.R. .................... 73/66
197710  10/1977   U.S.S.R. .................... 73/66

*Primary Examiner*—James J. Gill
*Attorney, Agent, or Firm*—Charles A. Warren

[57] ABSTRACT

A device for determining the angularity of unbalance of several disks to be assembled into a rotor construction in which a plurality of relatively pivoted members having appropriate linear and angular scales thereon are positionable with respect to one another to indicate the necessary angularity of the unbalanced points of the disks with respect to the amount of unbalance in the several disks.

7 Claims, 4 Drawing Figures

DEVICE FOR BALANCING DISKS

DESCRIPTION

1. Technical Field

In assembling a rotor made up of several stacked disks a device for defining the imbalance of several disks to position the unbalances in predetermined relation to one another to minimize the effect of the unbalance in the assembly rotor.

2. Background Art

It is common practice to assemble several stacked disks together sometimes with spacers therebetween to form a complete rotor. Whereas each disk or spacer is identified with the amount of unbalance, it is required that they be oriented so as to minimize their accumulative unbalance when assembled together. The necessary orientation of the several disks may be determined by a computer if properly programmed or by a programmable calculator either of which is an involved process and is time consuming. It is desirable that the determination of the angularity be established by a mechanical device that is readily adapted and operated by an assembler putting the several disks together. It will be understood that these several disks are normally held together by a circle of bolts extending through the several disks and such assembled rotors have particular utility in axial flow compressors and turbines particularly utilized in aircraft gas turbine engines.

DISCLOSURE OF INVENTION

A feature of the invention is a mechanical vector stack calculator by which to determine readily and visibly the relative angles for the several disks to be positioned in order to minimize their accumulative unbalance during assembly of the rotor. This is presuming that the extent and position of the unbalance has been established for each of the disks. Another feature is a single vector arrangement by which an assembler knowing the amount and location of the unbalance in each disk may readily determine directly the relative angles for positioning the several disks in relation to one another to provide an assembled rotor with a minimum of unbalance.

According to the invention a base member having a chart on which the unbalance for one part is plotted on a linear scale and an angular scale representing the necessary angular relation between the parts is also plotted from the same point of origin as the linear scale. Pivoted to this base is a linear scale having an unbalanced scale thereon for a second of the disks. Pivoted to this second linear scale is an angular scale member having an unbalanced scale for the third disk and an angular scale for the relative position of the disk. In some rotors where the disks are held assembled by a ring of thru bolts these angular scales may represent the location of the bolt holes in preference to or in addition to the degrees of angularity for the positioning of the several disks. By proper manipulation of these three relatively movable elements on properly located pivots the relative angles between the several disks may be read directly from the device.

The foregoing and other objects, features and advantages of the present invention will become more apparent in the light of the following detailed description of preferred embodiments thereof as shown in the accompanying drawing.

BEST MODE FOR CARRYING OUT THE INVENTION

The device is intended to permit assembly of three disks for a rotor where each individual disk has a known unbalance at a precise location. With this device the disks may be so located that the unbalances will cancel out and the assembled rotor will be essentially in balance. One particular use for the device is in assembling a built-up turbine or compressor rotor for an axial flow gas turbine engine where the disks of the rotor are held together by a row of bolts extending through holes in the disks and nuts on the ends of the bolts hold them in position in the disks and the disks in assembled relation in the completed rotor. This is a well known type of rotor construction.

The bolts are uniformly spaced apart angularly in the disk and with the number and angularity of the holes known the appropriate scales may be provided on the parts of the device. The description of the device is based on individual disks having 24 bolt holes thus spaced 15° apart although other hole spacing can readily be utilized as the device is intended and designed to indicate angularity of the unbalance rather than, or, addition to the bolt hole spacing.

Figure 1:
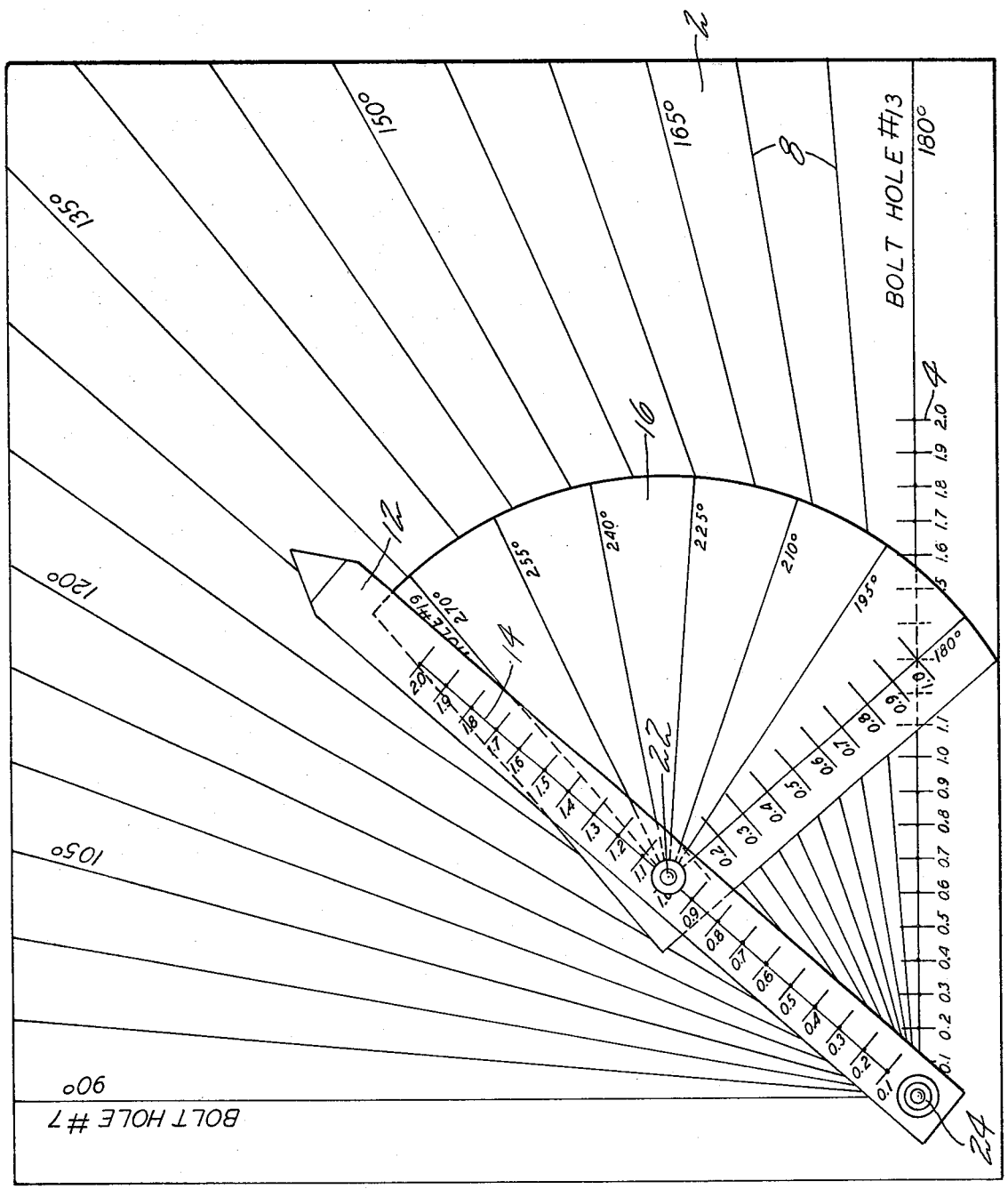
FIG. 1 is a plan of the device with the parts shown in a position for indicating the relative angles of three disks to be assembled.
Figure 2:
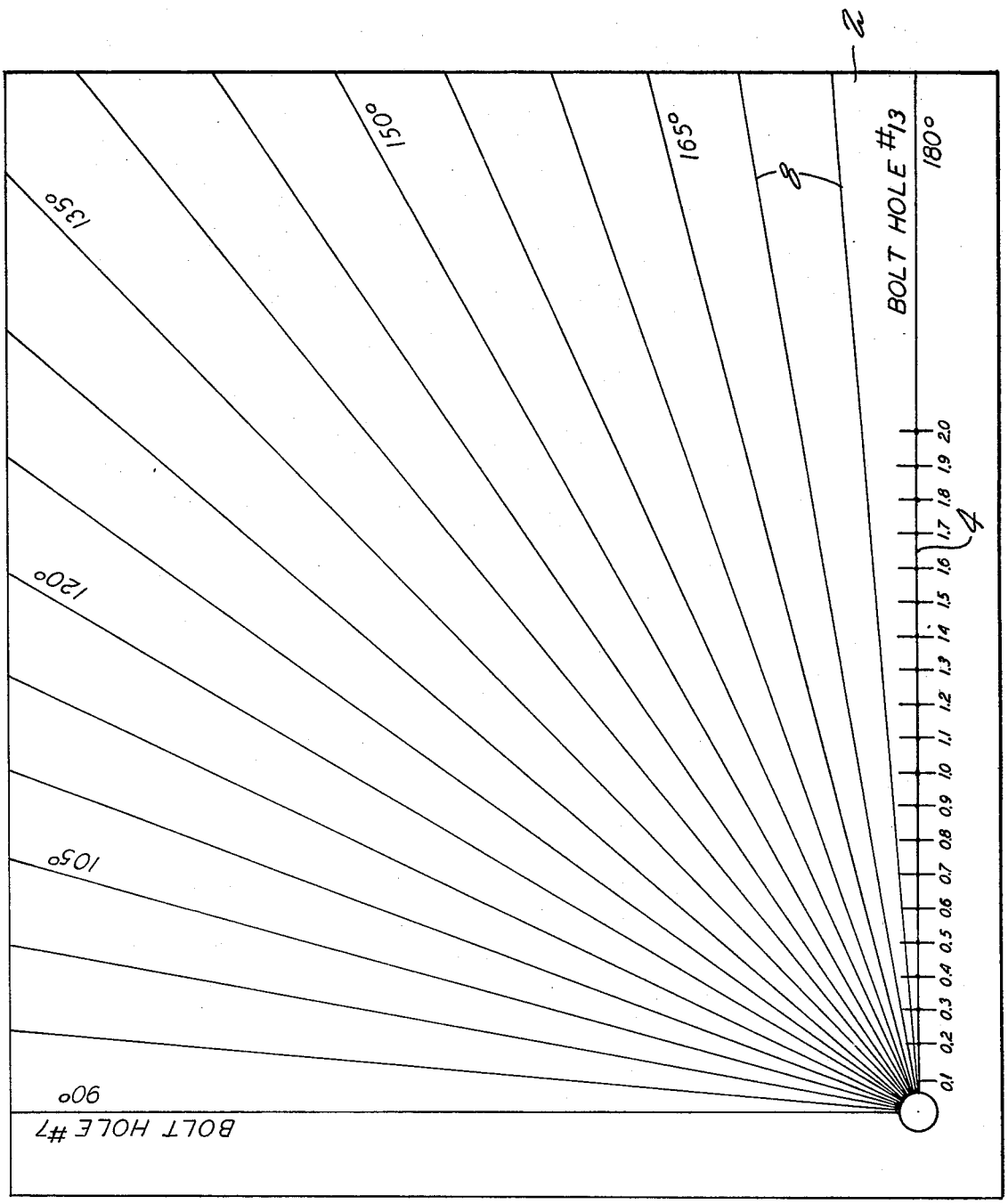
FIG. 2 is a detail of the base member.

Referring to FIG. 1 the base member 2 has a flat rigid surface having plotted thereon a scale 4, the scale representing the unbalance of the disk having the greatest unbalance of the three disks to be assembled. Thus as shown in FIG. 2 the scale is designed for unbalances from 0 to 2 ounce inches. This base member also has plotted thereon an angular scale 8 to indicate the angularity of the holes in the disks and this scale varies from 90° vertically from the 0° position to 180° at the horizontal, the center of this angular scale being the zero point of the unbalance scale.

Pivoted to the base member 2 at the point of zero unbalance on the scales is the linear scale member 12 on which is plotted in the same scale as on the base member an unbalance scale 14 to represent the unbalance of a second disk. Again the unbalance goes from 0 to 2 ounce inches of unbalance and it is on the same scale as the scale on the base member. As above stated this linear scale member 12 is pivoted by its zero point to the zero point on the unbalance scale on the base member.

Figure 3:
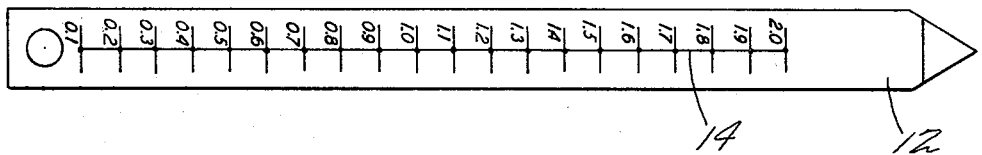
FIG. 3 is a detail of the linear scale member.
Figure 4:
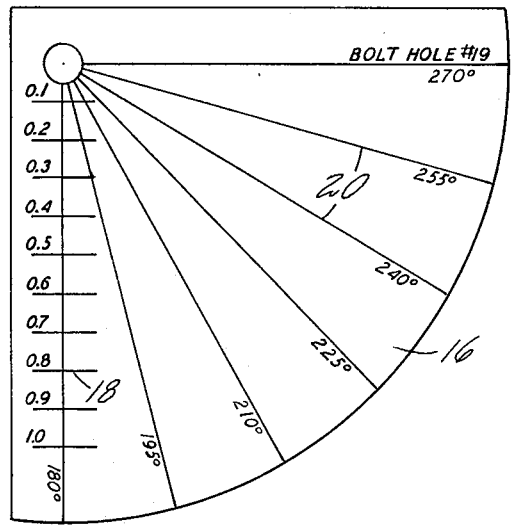
FIG. 4 is a detail of the angular scale member.

A third member 16 is an angular and linear scale member, on which is plotted from a zero point both a linear unbalance scale 18 and an angular scale 20, the latter going from 180° at the linear scale to 270° at right angles to the linear scale in a counterclockwise direction. These several scales are clearly marked as shown in FIGS. 2, 3 and 4 and in use serve to indicate directly the relative angular positions for assembly of the three disks. The linear unbalance scale 18 on the third member is on the same scale as the linear scales on the other members.

In use the member 16 is pivoted at its zero point to the linear scale 12 at the point of unbalance of the disk with the second greatest unbalance referred to for convenience as disk No. 2, this unbalance being 1.0 ounce inch. A suitable removable fastener 22 of any well known construction may hold these two members releasably together to permit pivotal movement and to permit adjustment of the scales in adapting them for disks of different unbalance.

Member 16 is then manipulated about the pivot points so that the amount of unbalance in disk No. 3 as indicated on the linear scale on angular member 16 is positioned to coincide with the amount of unbalance in disk No. 1 as indicated on the horizontal scale on the base member 2. Thus as shown in FIG. 1, the unbalance of disk No. 3 having been determined to be 1.0 ounce inch is aligned with the unbalance of disk No. 1 previously having been determined to be 1.3 ounce inch so that the several parts are in the position shown. Suitable holes may be provided in the members 2 and 16 for aid in locating the parts, utilizing pins.

With the device in the position now shown the angle of the disk No. 2 with respect to disk No. 1 is read directly from the angular scale 8 on the base member by the angle that the linear chart makes on this scale. Thus the angularity of the unbalance of disk 2 with respect to disk No. 1 would be 130° as shown. Disk Nos. 1 and 2 having thus been assembled together with the points of unbalance 130° with respect to one another, the angularity of disk No. 3 may be read from the angular scale on the member 16 by selecting the most nearly horizontal line on the angular scale on member 16. Thus disk No. 3 will be positioned with its location of unbalance 225° from the 0° angle of unbalance of disk No. 1. The linear scale is pivoted at the zero point of the scale to the zero point of scale 4 on member 2 as by a fastener 24.

Although it is obvious that the device is limited to disks having a relatively small amount of unbalance it will be understood that disks having a significant unbalance greater than that represented would not produce in normal constructions, a satisfactory rotor.

Although the invention has been shown and described with respect to a preferred embodiment thereof, it should be understood by those skilled in the art that other various changes and omissions in the form and detail thereof may be made therein without departing from the spirit and the scope of the invention.

I claim:

1. A device for determining the angularity of unbalance of several disks with respect to one another in assembling the disks into a rotor construction the device including:
   a base member having a linear scale of disk unbalance and an angular scale for disk positioning both said scales having the same zero point;
   a linear scale member pivoted at the zero point of the scale on the base member and having a linear scale of disk unbalance beginning at the pivot point; and
   an angular scale member pivoted to said linear scale member and having both an angular scale and a linear unbalance scale thereon.

2. A device as in claim 1 in which the pivot point of the angular scale is adjustable on the linear scale.

3. A device as in claim 1 in which the angular scale on the base member goes from 90° to 180° in a 90° angle from the linear scale.

4. A device as in claim 1 in which the angular scale on the angular scale member goes from 180° to 270° in a 90° angle from the linear scale on said member.

5. A device as in claim 1 in which the linear scale in the base member coincides with the 180° line of the angular scale on said member.

6. In the process of assembling three disks into a rotor construction using the device of claim 1 the steps of:
   positioning the pivot point of the angular scale member on the point of the linear scale on the linear scale member representing the unbalance of the first disk;
   positioning the point representing the unbalance of the third disk on the angular scale to coincide with the point on the linear scale on the base member representing the unbalance of the second disk;
   reading the angularity or the necessary angularity between the unbalance positions of disk Nos. 1 and 2 from the angular scale on the base member which coincides with the linear scale member; and
   reading the necessary angularity between disk Nos. 2 and 3 by the angular line on the angular scale member most nearly parallel to the linear scale on the base member.

7. The process of claim 6 including the steps of assembling disk Nos. 1, 2 and 3 with the indicated necessary angularity and bolting the disks together to form the rotor.

* * * * *